(12) United States Patent
Huang et al.

(10) Patent No.: US 8,199,439 B2
(45) Date of Patent: Jun. 12, 2012

(54) APPARATUS OF A SLIDER LIMITER FOR PROTECTING READ-WRITE HEAD FROM NON-OPERATIONAL SHOCK IN A HARD DISK DRIVE

(75) Inventors: Yao-Hsin Huang, San Jose, CA (US); Sean Kang, San Jose, CA (US); Bill Wang, San Jose, CA (US)

(73) Assignee: Seagate Technology International

( * ) Notice: Subject to any disclaimer, the term of this patent is extended or adjusted under 35 U.S.C. 154(b) by 470 days.

(21) Appl. No.: 12/402,410

(22) Filed: Mar. 11, 2009

(65) Prior Publication Data

US 2010/0232070 A1   Sep. 16, 2010

(51) Int. Cl.
*G11B 5/48* (2006.01)
(52) U.S. Cl. .................. 360/245.7; G9B/5.147
(58) Field of Classification Search ............... 360/245.7; G9B/5.147
See application file for complete search history.

(56) References Cited

U.S. PATENT DOCUMENTS

2007/0081269 A1* 4/2007 Kim et al. ................. 360/97.02
2008/0239577 A1* 10/2008 Zeng et al. ................. 360/245.1

* cited by examiner

*Primary Examiner* — Hoai V Ho

(57) ABSTRACT

This application discloses a hard disk drive comprising a landing ramp mounted to a disk base including a slider limiter for at least one slider in the hard disk drive to limit movement of the sliders during a non-operational shock event while parked on the loading ramp. Each of the slider limiters includes a clearance zone configured so that when the slider contacts the slider limiter during the non-operational event, the read-write head remains out of contact with the slider limiter. The clearance zone may include a recess and/or a cutout. The clearance zone may include a recess and/or a cutout. The recess may take any shape, for example the recess may be a polygon and/or curved in cross section. The polygon may have at least two sides. The clearance zone may further include a radial bulge to further protect the read-write head during non-operational shock events.

9 Claims, 3 Drawing Sheets

APPARATUS OF A SLIDER LIMITER FOR PROTECTING READ-WRITE HEAD FROM NON-OPERATIONAL SHOCK IN A HARD DISK DRIVE

TECHNICAL FIELD

This invention relates to the slider limiter for a landing ramp in a load-unload hard disk drive.

BACKGROUND OF THE INVENTION

Landing ramps have been used for many years to park the sliders with their read-write heads when a hard disk drive is not operational. Slider limiters have been used to further restrict movement of sliders when the hard disk drive experiences a non-operational shock, for instance, when the system containing the drive is dropped. Such systems may include a portable media player or notebook computer. The inventors have found that the slider limiter itself may damage the read-write heads during these events. The slider limiter needs improvement to reduce the effects of non-operational shocks.

SUMMARY OF THE INVENTION

Embodiments of the invention include a hard disk drive comprising a disk base, a spindle motor mounted on the disk base for rotating at least one disk to create at least one rotating disk surface, and a head stack assembly pivotably coupled to the disk base for positioning at least one head gimbal assembly with its slider over the rotating disk surface. A landing ramp is mounted to the disk base either near the inside diameter of the rotating disk surfaces or near the outside diameter and configured to support the head gimbal assemblies when the hard disk drive is non-operational. The landing ramp further includes a slider limiter for at least one slider in the hard disk drive to limit movement of the sliders during a non-operational shock event. Each of the slider limiters includes a clearance zone configured so that when the slider contacts the slider limiter during the non-operational event, the read-write head remains out of contact with the slider limiter.

The clearance zone may include a recess and/or a cutout. The recess may take any shape, for example the recess may be a polygon and/or curved in cross section. The polygon may have at least two sides as shown in FIGS. 5A and 5B. The clearance zone may further include a radial bulge to further protect the read-write head during non-operational shock events.

BRIEF DESCRIPTION OF THE DRAWINGS

In FIG. 5A the polygon has two sides and in FIG. 5B the polygon has three sides. In embodiments of the hard disk drive in which the slider limiter is configured to be near only one slider the slider limiter might have just one recess. In other embodiments the recesses may include different polygons.

DETAILED DESCRIPTION

This invention relates to the slider limiter for a landing ramp in a load-unload hard disk drive. Embodiments of the invention include a hard disk drive comprising a landing ramp mounted to a disk base including a slider limiter for at least one slider in the hard disk drive to limit movement of the sliders during a non-operational shock event while parked on the loading ramp. Each of the slider limiters includes a clearance zone configured so that when the slider contacts the slider limiter during the non-operational event, the read-write head remains out of contact with the slider limiter. The clearance zone may include a recess and/or a cutout. The recess may be a polygon and/or curved. The clearance zone may further include a radial bulge to further protect the read-write head during non-operational shock events.

Figure 1:
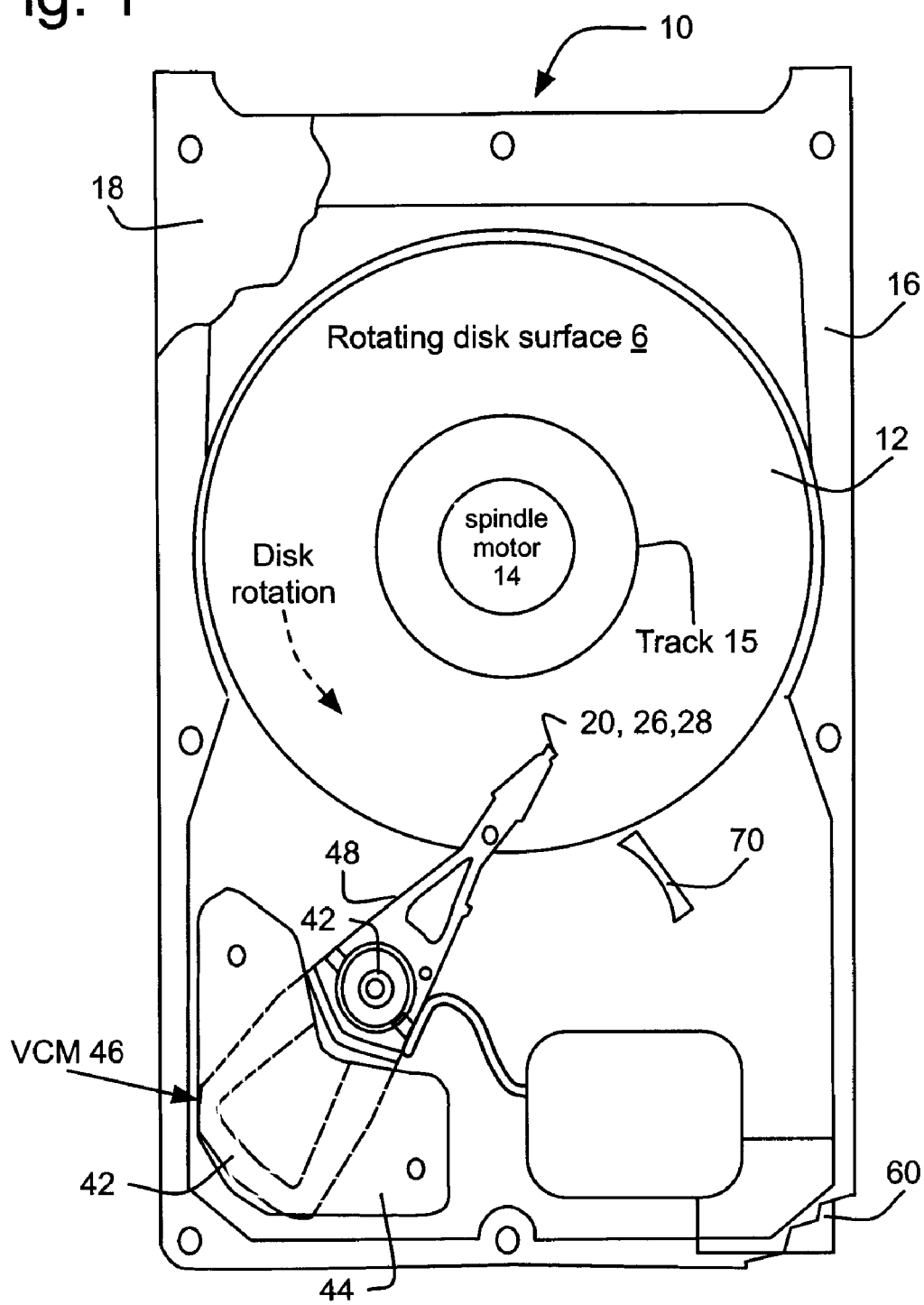
FIG. 1 shows an example of an embodiment of the invention as a hard disk drive including a disk base to which a spindle motor is mounted with at least one disk rotatably coupled to the spindle motor to create a rotating disk surface. A voice coil motor includes a head stack assembly pivotably mounted by an actuator pivot to the disk base, responsive to its voice coil interacting with a fixed magnetic assembly mounted on the disk base and may include a head gimbal assembly with or without a micro-actuator hinge configured to position at least one slider to access data stored on the rotating disk surface. A landing ramp is mounted to the disk base either near the inside diameter of the rotating disk surfaces or near the outside diameter and configured to support the head gimbal assemblies when the hard disk drive is non-operational. The hard disk drive includes an assembled circuit board also mounted on the disk base opposite the spindle motor and the voice coil motor.

Referring to the drawings more particularly by reference numbers, FIG. 1 shows an example of an embodiment of the invention as a hard disk drive 10 including a disk base 2 to which a spindle motor 14 is mounted with at least one disk 8 rotatably coupled to the spindle motor to create a rotating disk surface 6. A voice coil motor 36 includes a head stack assembly 12 pivotably mounted by an actuator pivot 30 to the disk base, responsive to its voice coil 32 interacting with a fixed magnetic assembly 34 mounted on the disk base and including a head gimbal assembly 28 configured to position at least one slider 20 to access data stored on the rotating disk surface. A landing ramp is mounted to the disk base either near the inside diameter of the rotating disk surfaces or near the outside diameter and configured to support the head gimbal assemblies when the hard disk drive is non-operational. The hard disk drive includes an assembled circuit board 38 also mounted on the disk base opposite the spindle motor and the voice coil motor. A disk cover 4 is mounted on the disk base to encapsulate all of the shown components except the assembled circuit board.

The hard disk drive 10 preferably accesses the data arranged in tracks on the rotating disk surface 6 by controlling the spindle motor 14 to rotate the disks 8 at a preferred rate. The data may be organized as tracks that may be configured as concentric circles or as a tightly packed spiral. The voice coil motor 36 operates by stimulating the voice coil 32 with a time varying electrical signal to magnetically interact with the fixed magnet assembly 34 causing the head stack assembly 12 to pivot about the actuator pivot 30 moving the head gimbal assembly 28 to position the slider 20 near the track on the rotating disk surface. In many embodiments, a micro-actuator assembly preferably coupled to the slider may be further stimulated to further control the position of the slider. A vertical micro-actuator either in the micro-actuator assembly, or preferably in the slider, may be stimulated to alter the flying height of the slider over the rotating disk surface.

Figure 2B:
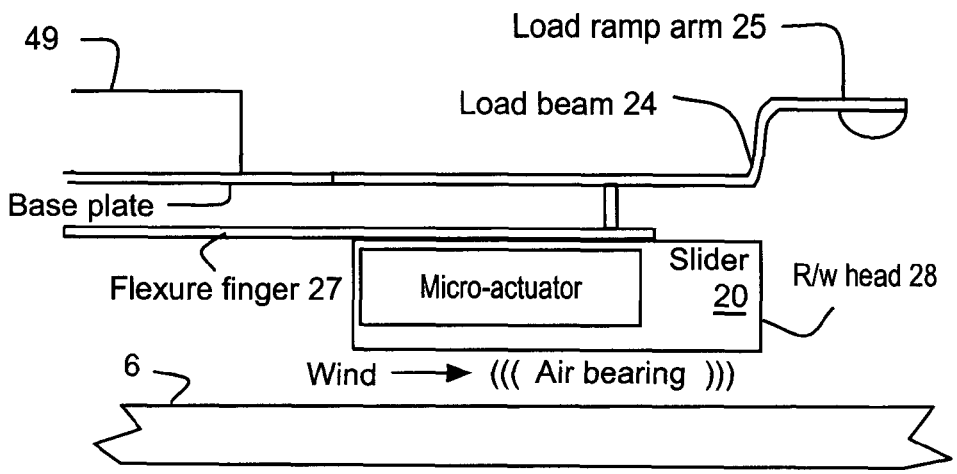
FIG. 2B shows a side view of some details of a head gimbal assembly of the previous Figures showing the head gimbal assembly coupled to an actuator arm by a base plate that couples to a load beam. A flexure finger may couple to the load beam and may support a slider containing a read-write head, which during access operations flies on an air bearing over the rotating disk surface. The load beam may include a loading ramp arm configured to engage the loading ramp to park the head gimbal assembly when not in access operations. Mechanical shocks to the hard disk drive when the sliders are parked on the loading ramp will be referred to as non-operational shocks.
Figure 2A:
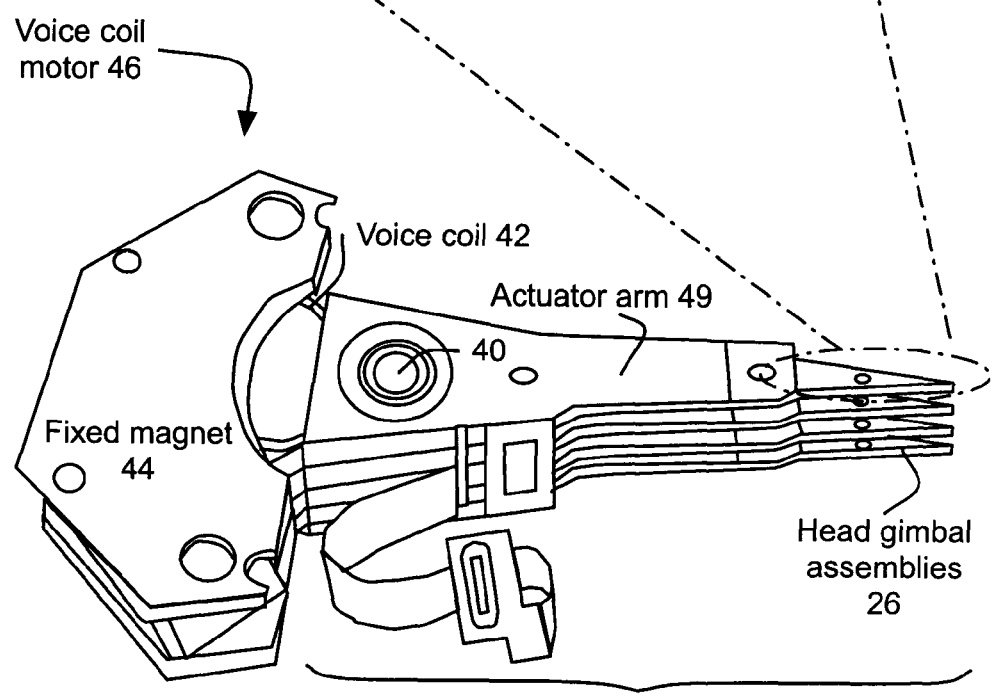
FIG. 2A shows a perspective view of the voice coil motor, its head stack assembly and the one or more head gimbal assemblies coupled to the one or more actuator arms of FIG. 1.

FIG. 2A shows a perspective view of the voice coil motor 36, its head stack assembly 12 and the one or more head gimbal assemblies 28 coupled to the one or more actuator arms 40 of FIG. 1. The head stack assembly is configured to pivot about the actuator pivot 30.

FIG. 2B shows a side view of some details of a head gimbal assembly 26 of the previous Figures showing the head gimbal assembly coupled to an actuator arm 49 by a base plate that couples to a load beam 24. A flexure finger 27 may couple to the load beam and may support a slider 20 containing a read-write head 28, which during access operations flies on an air bearing over the rotating disk surface 6. The load beam may include a loading ramp arm 25 configured to engage the loading ramp 70 of FIG. 1 to park the head gimbal assembly when not in access operations. Mechanical shocks to the hard disk drive when the sliders are parked on the loading ramp will be referred to as non-operational shocks.

Figure 3:
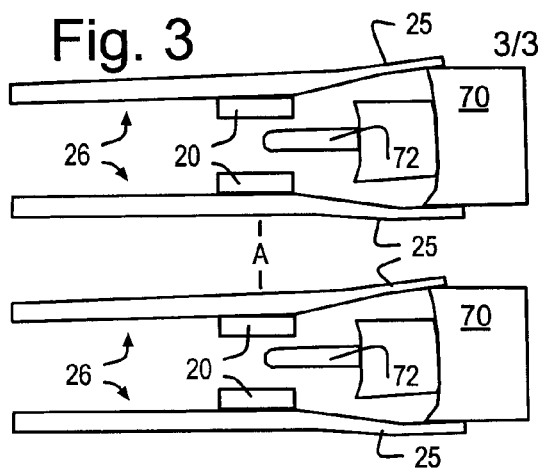
FIG. 3 shows a side view of the landing ramp engaging the head gimbal assemblies included in the head stack assembly with the loading ramp arms engaging the loading ramps to park the sliders between the slider limiter. The slider limiters are configured to limit the motion of the sliders during non-operational shocks.

FIG. 3 shows a side view of the landing ramp 70 engaging the head gimbal assemblies 26 included in the head stack assembly 48 with the loading ramp arms 25 further engaging the loading ramps to park the sliders 20 between the slider limiters 72. The slider limiters are configured to limit the motion of the sliders during non-operational shocks.

Figure 4:
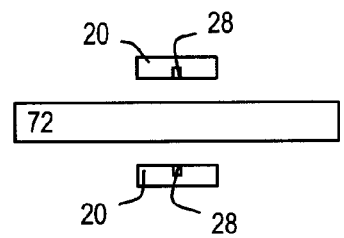
FIG. 4 shows the cross section A of an example of a prior art slider limiter between the two sliders of FIG. 3 with the relative position of their read-write heads. The problems with this configuration is that if the non-operational shock is sufficient for the slider to contact the slider limiter, the read-write head may also be placed in contact, possibly degrading and/or damaging its performance in future access operations.

FIG. 4 shows the cross section A of an example of a prior art slider limiter 72 between the two sliders 20 of FIG. 3 with the relative position of their read-write heads 28. The problems with this configuration is that if the non-operational shock is sufficient for the slider to contact the slider limiter, the read-write head may also be placed in contact, possibly degrading and/or damaging its performance in future access operations.

Figure 5A:
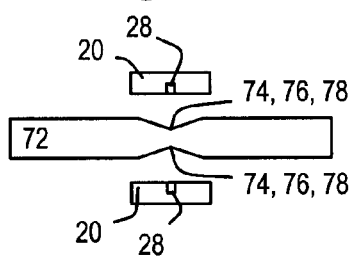
FIGS. 5A and 5B show the cross section A of examples of slider limiter embodiments including a recess comprising a polygon for each of the nearby sliders.
Figure 5B:
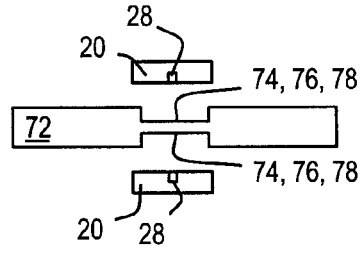

FIGS. 5A and 5B show the cross section A of examples of slider limiter 72 embodiments including a clearance zone 74 configured to keep the read-write head 28 for each of the nearby sliders 20 from contact with the slider limiter during the non-operational shock. The clearance zone may include a recess and/or a cutout. The recess may take any shape, for example the recess may be a polygon and/or curved in cross section. One or more of the clearance zones may include a recess 76 comprising a polygon 78. In FIG. 5A the polygon has two sides and in FIG. 5B the polygon has three sides. In embodiments of the hard disk drive in which the slider limiter is configured to be near only one slider the slider limiter might have just one recess. In other embodiments the recesses may include different polygons.

Figure 6:
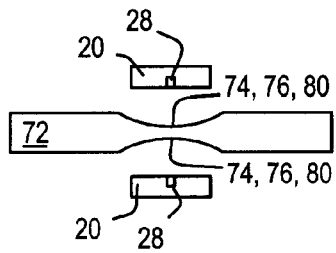
FIG. 6 shows the cross section A of an example of an alternative embodiment of the slider limiter's recess that is curved and may be configured so that the recess provides the contact with the sides of the slider during non-operational shock events.

FIG. 6 shows the cross section A of an example of an alternative embodiment of the slider limiter's 72 recess 76 that is curved 80 and may be configured so that the recess provides the contact with the sides of the slider 20 during non-operational shock events.

Figure 7:
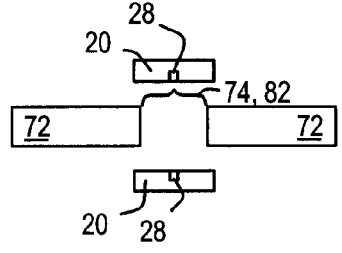
FIG. 7 shows the cross section A of another example of an alternative embodiment where the slider limiter's recess that may include a cut out between the two sliders.

FIG. 7 shows the cross section A of another example of an alternative embodiment where the slider limiter's 70 recess 76 may include a cut out 82 between the two sliders 20.

Figure 8:
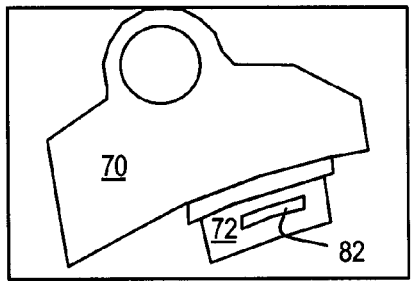
FIG. 8 shows a slider limiter found in a prior art hard disk drive that may have a cut out of uniform radial depth.

FIG. 8 shows a slider limiter 72 found in a prior art hard disk drive that may have a cut out 82 of uniform radial depth.

Figure 9:
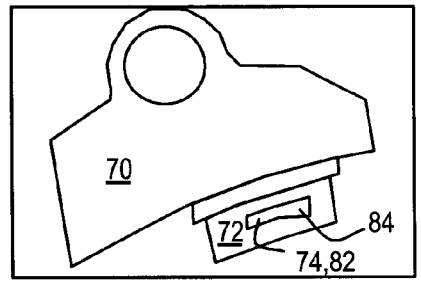
FIG. 9 shows an example of embodiment of the slider limiter of FIG. 7 showing a radial bulge to further protect the slider during non-operational shocks.

FIG. 9 shows an example of embodiment of the slider limiter 72 of FIG. 7 showing the recess 74 and possibly a cut-out 82 further including a radial bulge 84 that may further protect the read-write heads 28 during the non-operational shocks.

The preceding embodiments provide examples of the invention, and are not meant to constrain the scope of the following claims.

What is claimed is:
1. A hard disk drive, comprising:
a disk base;
a spindle motor mounted on said disk base and rotatably coupled to at least one disk to create at least one rotating disk surface; and
a head stack assembly pivotably mounted to said disk base to position at least one head gimbal assembly with a slider over said rotating disk surface; and
a landing ramp mounted on said disk base configured to support said head gimbal assemblies, comprising a slider limiter for at least one of said slider and including at least one clearance zone further including a recess configured to keep a read-write head in said slider out of contact with said slider limiter in response to a non-operational shock; and
wherein:
said recess is a polygon, in cross section, having at least two sides.
2. The hard disk drive of claim 1, wherein said polygon has exactly two sides.
3. The hard disk drive of claim 1, wherein said recess is curved in cross section.
4. The hard disk drive of claim 1, wherein said clearance zone further includes a radial bulge to further protect said read-write head during said non-operational shock events.
5. A hard disk drive, comprising:
a disk base;
a spindle motor mounted on said disk base and rotatably coupled to at least one disk to create at least one rotating disk surface; and a head stack assembly pivotably mounted to said disk base to position at least one head gimbal assembly with a slider over said rotating disk surface; and a landing ramp mounted on said disk base configured to support said head gimbal assemblies, comprising a slider limiter for at least one of said slider, with each of said slider limiters including at least one clearance zone configured to keep a read-write head in said slider out of contact with said slider limiter in response to a non-operational shock; and wherein:

at least one of said clearance zones includes a recess having a polygon cross section and said polygon has at least two sides.

6. The hard disk drive of claim 5, wherein at least one of said clearance zones includes a cutout and a radial bulge to further protect said read-write head during said non-operational shock events.

7. The hard disk drive of claim 5, wherein said polygon has exactly two sides.

8. The hard disk drive of claim 5, wherein said recess is curved in cross section.

9. The hard disk drive of claim 5, wherein said clearance zone further includes a radial bulge to further protect said read-write head during said non-operational shock events.

* * * * *